(12) United States Patent
Chen

(10) Patent No.: US 6,575,536 B2
(45) Date of Patent: Jun. 10, 2003

(54) BOLT STRUCTURE FOR FASTENING A TRUCK WHEEL

(75) Inventor: Mu-Chun Chen, Chang Hua Hsien (TW)

(73) Assignee: Show Than Industry Co., Ltd., Chang Hua Hsien (TW)

( * ) Notice: Subject to any disclaimer, the term of this patent is extended or adjusted under 35 U.S.C. 154(b) by 0 days.

(21) Appl. No.: 09/976,589

(22) Filed: Oct. 15, 2001

(65) Prior Publication Data

US 2003/0071514 A1 Apr. 17, 2003

(51) Int. Cl.⁷ .............. B60B 1/00; B60B 25/00; F16B 35/00; F16B 37/14
(52) U.S. Cl. .............. 301/35.623; 301/35.54; 301/35.628; 411/389; 411/431
(58) Field of Search .............. 411/383, 384, 411/389, 427, 431, 432; 301/9.1, 9.2, 35.54, 35.61, 35.622, 35.623, 35.624, 35.625, 35.628, 35.632, 37.374, 111.01, 111.04, 111.07

(56) References Cited

U.S. PATENT DOCUMENTS

| | | | | |
|---|---|---|---|---|
| 1,299,415 A | * | 4/1919 | Anderson | 411/432 |
| 1,321,967 A | * | 11/1919 | Woodward | 301/35.54 |
| 1,563,059 A | * | 11/1925 | Acker | 301/35.623 |
| 1,908,024 A | * | 5/1933 | Keller | 301/5.1 |
| 1,945,857 A | * | 2/1934 | Harter | 439/727 |
| 1,974,746 A | * | 9/1934 | Kuhnen | 301/35.625 |
| 2,107,925 A | * | 2/1938 | Ash | 301/36.1 |
| 3,960,047 A | * | 6/1976 | Liffick | 411/429 |
| 4,223,585 A | * | 9/1980 | Barth et al. | 411/389 |
| 4,322,195 A | * | 3/1982 | Rebish et al. | 411/431 |
| 4,729,707 A | * | 3/1988 | Takahashi | 411/389 |
| 5,312,005 A | * | 5/1994 | Odell | 411/389 |
| 5,333,978 A | * | 8/1994 | Rives | 411/389 |
| 5,618,145 A | * | 4/1997 | Kuo | 411/432 |
| 5,749,690 A | * | 5/1998 | Kutz | 411/431 |
| 5,769,583 A | * | 6/1998 | Girbinger | 411/389 |
| 5,988,966 A | * | 11/1999 | Chen et al. | 411/372 |

* cited by examiner

Primary Examiner—S. Joseph Morano
Assistant Examiner—Jason R. Bellinger
(74) Attorney, Agent, or Firm—Harrison & Egbert

(57) ABSTRACT

A bolt structure is designed to fasten together a hub, an inner wheel rim, and an outer wheel rim of a motor vehicle wheel. The bolt structure includes a bolt body, an inner nut, an outer nut, and a protective cap. The bolt body has a large diametrical segment, a small diametrical segment, and a midsegment located between the large diametrical segment and the small diametrical. The inner nut is engaged with the small diametrical segment, whereas the outer nut is engaged with the large diametrical segment and the protective cap. The midsegment of the bolt body retains the hub of the motor vehicle wheel.

2 Claims, 9 Drawing Sheets

BOLT STRUCTURE FOR FASTENING A TRUCK WHEEL

BACKGROUND OF THE INVENTION

1. Field of the Invention

The present invention relates generally to the wheel of a heavy-duty motor vehicle, such as a truck or bus, and more particularly to a bolt structure for fastening the wheel of the heavy duty motor vehicle.

2. Description of Related Art

The conventional wheel of the heavy-duty motor vehicle is generally formed of a hub, an inner wheel rim, and an outer wheel rim, which are fastened together by a plurality of bolts and nuts. Such conventional bolts and nuts are defective in design in that they are not provided with means to prevent the unfastening of the nut with the bolt, and that they are neither dustproof nor rustproof.

BRIEF SUMMARY OF THE INVENTION

The primary objective of the present invention is to provide a bolt structure which is designed to fasten the wheel of a heavy-duty motor vehicle and is free of the deficiencies of the conventional bolt structure described above.

In keeping with the principle of the present invention, the foregoing objective of the present invention is attained by a bolt structure which is formed of a bolt body, an inner nut, and an outer nut. The hub, the inner wheel rim, and the outer wheel rim of a truck wheel are fastened securely together by the bolt structure of the present invention. The inner nut is provided with means to prevent it from being unfastened with the bolt body. The outer nut is dustproof and rustproof. As a result, the outer nut does not jam the bolt structure of the present invention.

The objective, features and functions of the present invention will be more readily understood upon a thoughtful deliberation of the following detailed description of the present invention in reference to the accompanying drawings.

DETAILED DESCRIPTION OF THE INVENTION

Figure 1:
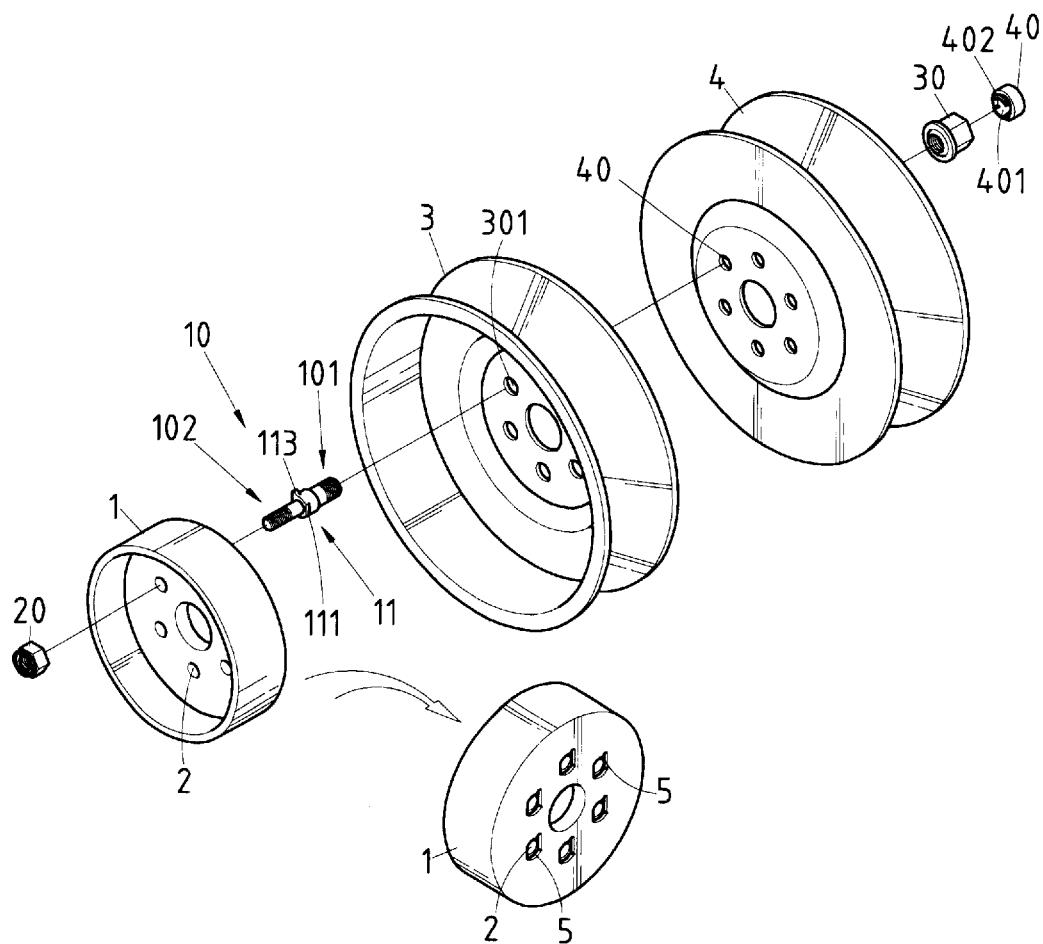
FIG. 1 is an exploded view showing the working relationship between the bolt structure of the present invention and a truck wheel.
Figure 2:
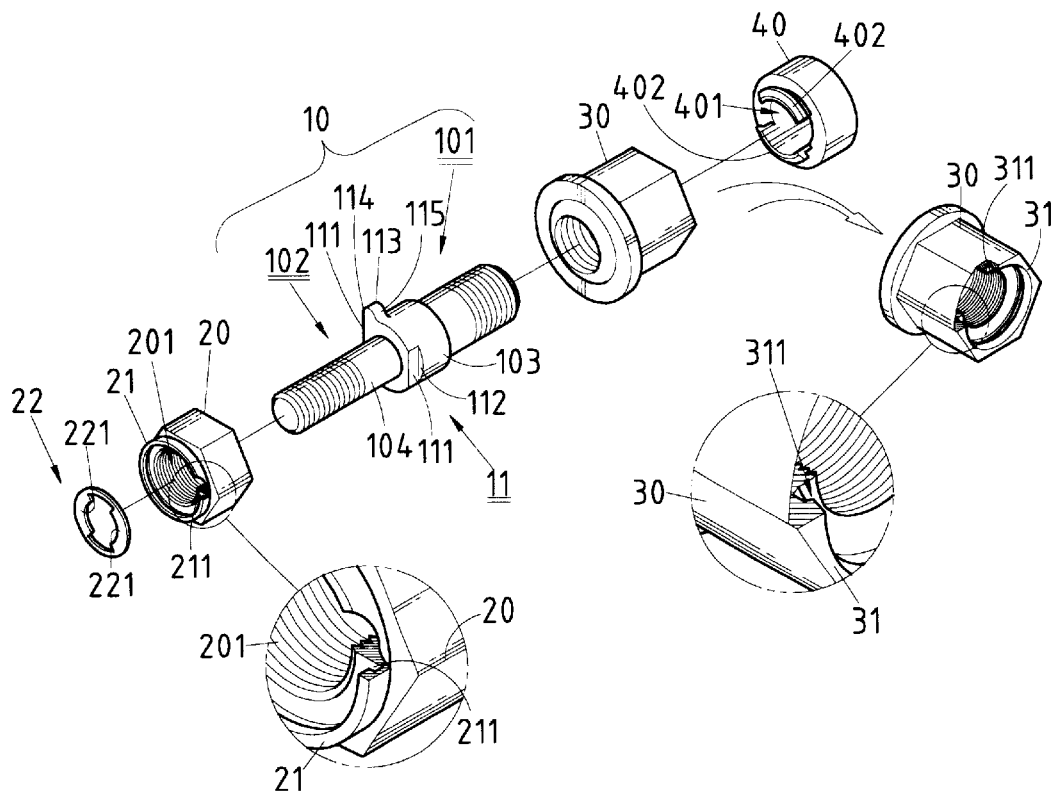
FIG. 2 shows an exploded schematic view of the bolt structure of the present invention.
Figure 3:
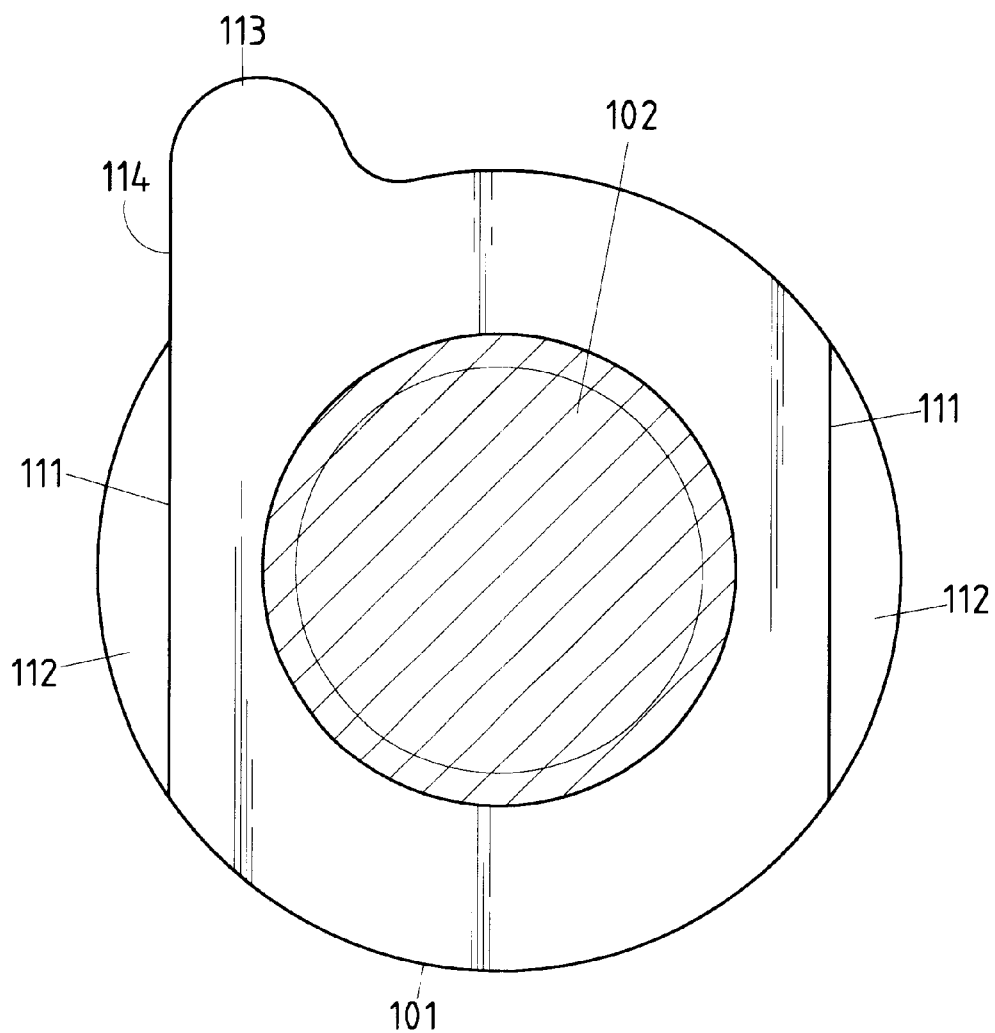
FIG. 3 shows a cross-sectional view of the midsegment of the bolt body of the present invention.
Figure 4:
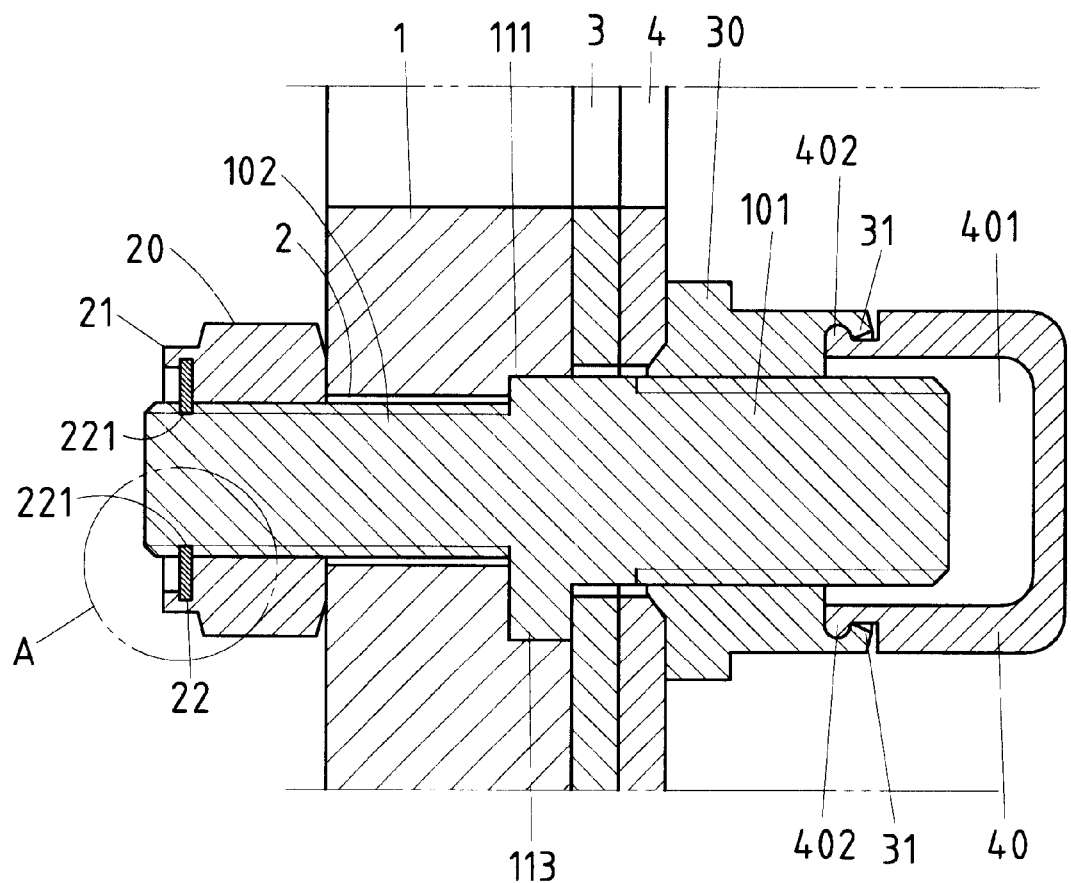
FIG. 4 shows a longitudinal sectional view of the bolt structure of the present invention at work.
Figure 5:
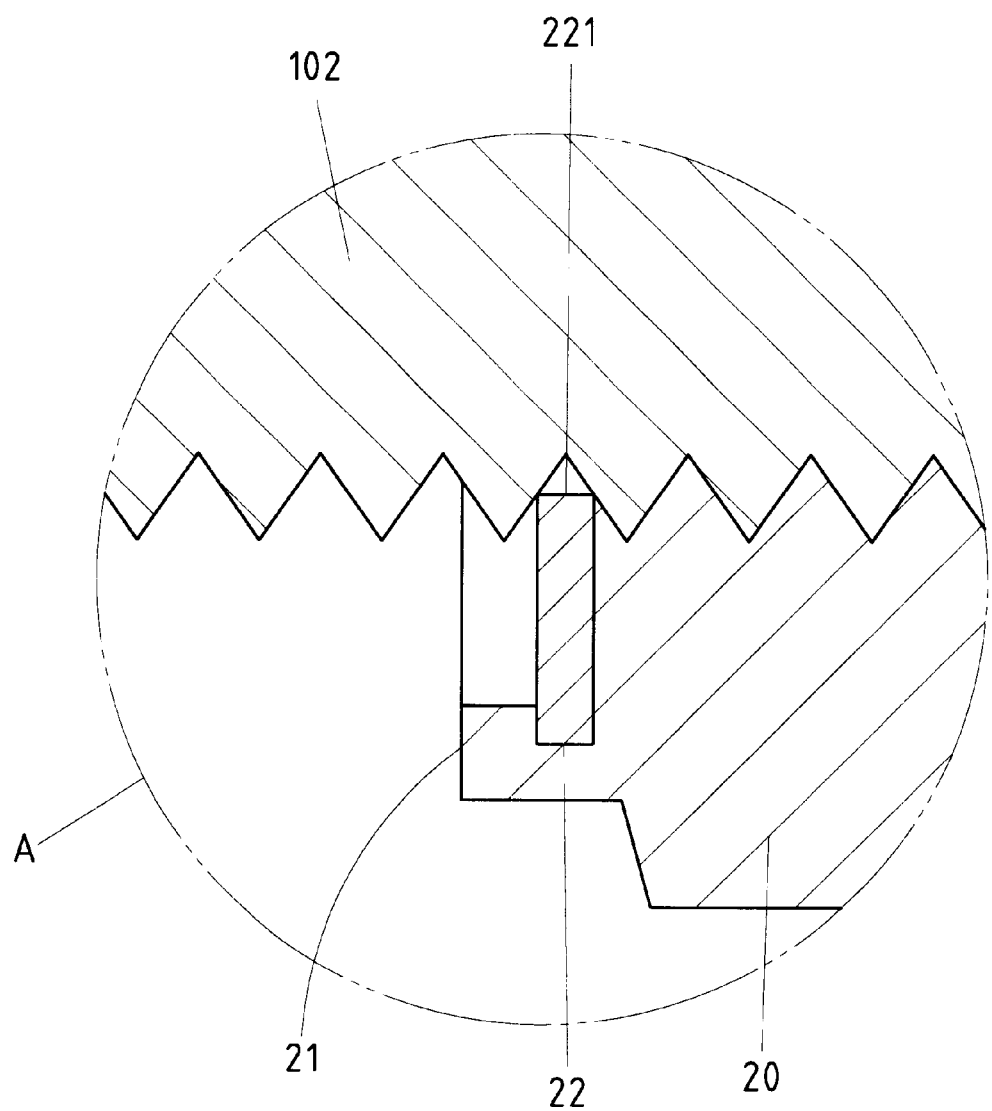
FIG. 5 shows an enlarged sectional view of a portion indicated by a circle "A" as shown is FIG. 4.

As shown in FIGS. 1–5, a bolt structure embodied in the present invention is designed to fasten together a hub 1, an inner wheel rim 3, and an outer wheel rim 4 of the truck wheel. The bolt structure of the present invention comprises a bolt body 10, an inner nut 20, an outer nut 30, and a protective cap 40.

The bolt body 10 has a large diametrical segment 101, and a small diametrical segment 102 opposite in location to the large diametrical segment 101. The bolt body 10 further has a midsegment 11 which is located between the large diametrical segment 101 and the small diametrical segment 102, and is provided with two smooth surfaces 103 and 104. The large diametrical segment 101 and the small diametrical segment 102 are provided with an outer threaded portion. The midsegment 11 is provided in the outer surface of two opposite sides thereof with a tangent plane 111 such that a head stop edge 112 is formed between the tangent plane 111 and the outer diameter of the large diametrical segment 101. A position confining portion 113 is formed at the juncture of one side of one of the two tangent planes 111 and the outer diameter of the large diametrical segment 101. The position confining portion 113 has one side 114 which is coplanar with the tangent plane 111, and other side 115 which forms an appropriate angle with the outer diameter of the large diametrical segment 101. The small diametrical segment 102 of the bolt body 10 is put through one of the through holes 2 of the hub 1 of the truck wheel. The through holes 2 are provided in one end with a retaining slot 5 which is corresponding in cross section to the midsegment 11 serving as a retaining portion of the bolt body 10. The midsegment 11 of the bolt body 10 is retained in the retaining slot 5 of the hub 1 so as to prevent the bolt body 10 from turning in relation to the hub 1. In addition, the wall of the hub 1 is stopped by the head stop edge 112. In the meantime, the large diametrical segment 101 of the bolt body 10 is put through one of the through holes 301 of the inner wheel rim 3 of the truck wheel and one of the through holes 40 of the outer wheel rim 4 of the truck wheel such that the outer thread portion of the large diametrical segment 101 extends out of the outer wheel rim 4.

The inner nut 20 is enlarged with the outer threaded portion of the small diametrical segment 102 of the bolt body and is provided in the outer edge of the outer end thereof with a protruded ring 21 which is in, turn provided in the inner periphery with an annular groove 211 for retaining a retaining ring 22 in contact with the outer end wall of the inner nut 20. The retaining ring 22 is provided in the inner periphery with a plurality of retaining pieces 221, with each having an arcuate edge corresponding in radian to a threaded hole 201 of the inner nut 20. Each retaining piece 221 has an inner diameter which is smaller than an inner diameter of the threaded hole 201 of the inner nut 20. When the inner nut 20 is fastened with the outer threaded portion of the small diametrical segment 102 of the bolt body 10, the arcuate edges of the retaining pieces 221 of the retaining ring 22 are forced into the grooves of the outer threaded portion of the small diametrical segment 102 of the bolt body 10.

The outer nut 30 is engaged with the outer threaded portion of the large diametrical segment 101 of the bolt body 10 for locating the inner wheel rim 3 and the outer wheel rim 4 of the truck wheel. The outer nut 30 is provided in the outer peripheral edge of the outer end thereof with an annular protrusion 31 which is in turn provided in the inner peripheral edge with a retaining slot 311.

The protective cap 40 has a closed outer end and is provided at the inner end with an opening 401, and two retaining bodies 402 which are opposite to each other and are, located in proximity of the opening 401. The protective cap 40 is engaged with the outer nut 30 such that the two retaining bodies 402 of the protective cap 40 are retained in the retaining slot 311 of the annular protrusion 31 of the outer nut 30. The protective cap 40 has a length greater than the length of a portion of the large diametrical segment 101 of the bolt body 10 which extends out of the outer nut 30. The protective cap 40 has an outer end wall which is smaller in thickness than the outer diameter wall of the protective cap 40. As a result, the outer diameter wall of the protective cap 40 has an appropriate compression elasticity. The protective cap 40 encloses the outer end wall of the outer nut 30 and the extended portion of the large diametrical segment 101 of the bolt body 10.

The present invention has several advantages, as illustrated in FIGS. 1–4. In the first place, the present invention is relatively simple in construction such that the bolt structure of the present invention comprises the bolt body 10, the inner nut 20, and the outer nut 30 by means of which the hub 1, the inner wheel rim 3, and the outer wheel rim 4 are fastened together securely. The bolt body 10 is located securely by its midsegment 11 which serves as a retaining portion to engage the retaining slot 5 of the hub 1. In addition, one side 114 of the position confining portion 113 gives an added length to the moment of force of the tangent plane 111, thereby enhancing the capability of the bolt body 10 to be impacted on in its radial direction. As a result, the bolt body 10 is prevented from being moved in the radial direction by an external force.

In light of the inner nut 20 being provided with a plurality of retaining pieces 221 which are forced into the grooves of the outer threaded portion of the small diametrical segment 102 of the bolt body 10, the inner nut 20 is securely engaged with the outer threaded portion of the small diametrical segment 102 of the bolt body 10.

The outer nut 30 of the present invention is protected by the protective cap 40 and is therefore dustproof and rustproof. In addition, the large diametrical segment 101 of the bolt body 10 is also protected by the protective cap 40 and is thus dustproof and rustproof. In light of the protection provided by the protective cap 40, the bolt structure of the present invention is prevented from being unworkable through the jamming of the outer nut 30 and the outer threaded portion of the large diametrical segment 101 of the bolt body 10.

Figure 6:
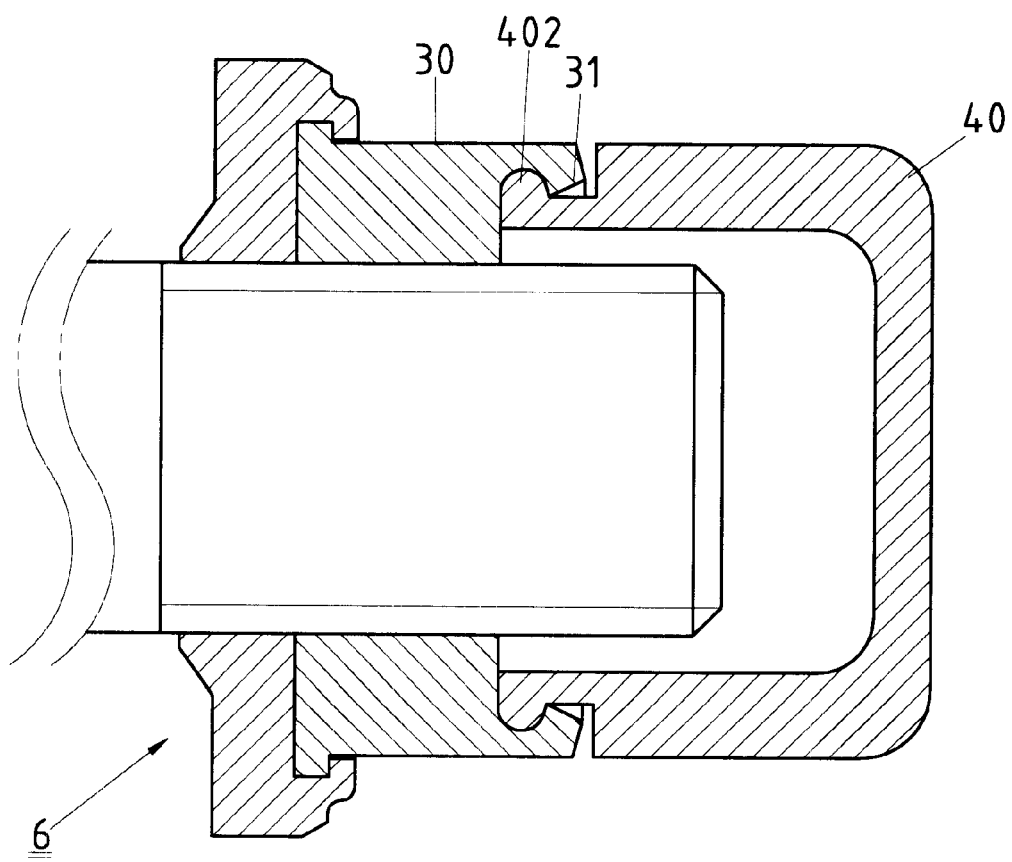
FIG. 6 shows a schematic view of a protective cap of the present invention at work.
Figure 7:
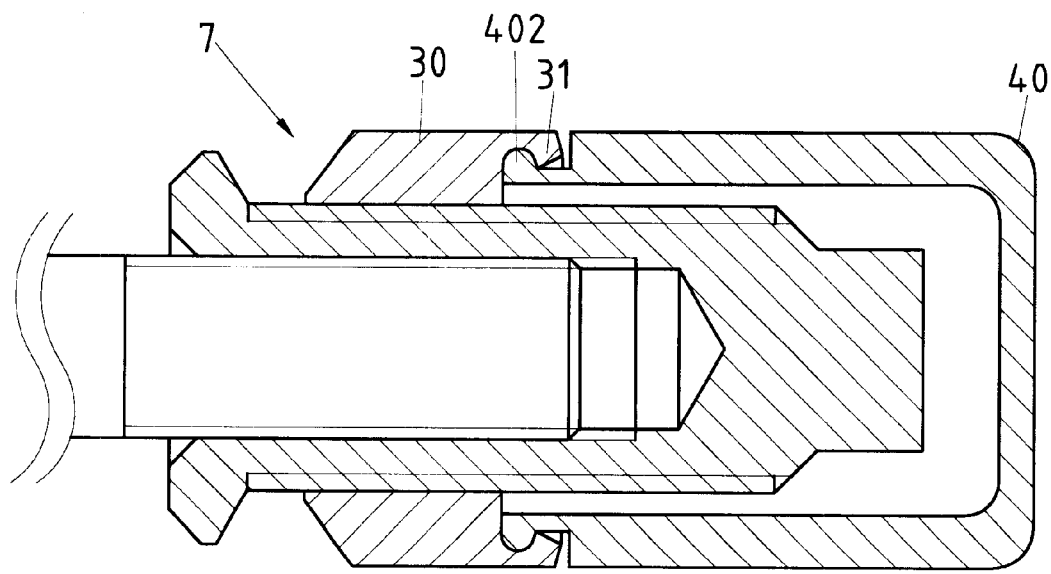
FIG. 7 shows another schematic view of the protective cap of the present invention at work.

As shown in FIGS. 6 and 7, the protective cap 40 is applicable to other types of fastening bolts 6 and 7 which are used to fasten the wheels of various motor vehicles. In the meantime, the outer nut 30 is provided in the outer end wall with the annular protrusion 31 and the retaining slot 311.

Figure 8:
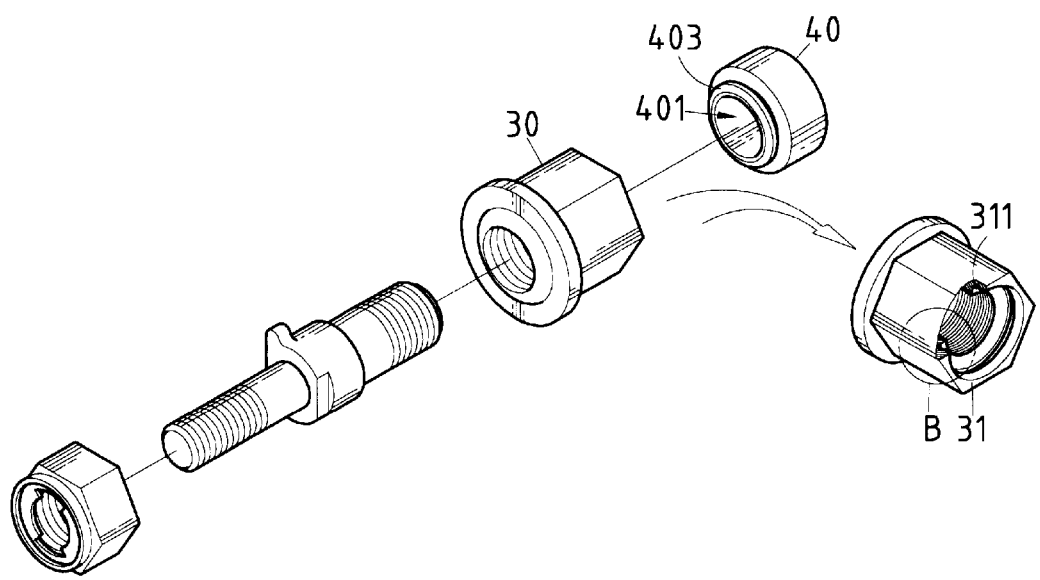
FIG. 8 shows an exploded schematic view of another preferred embodiment of the present invention.
Figure 9:
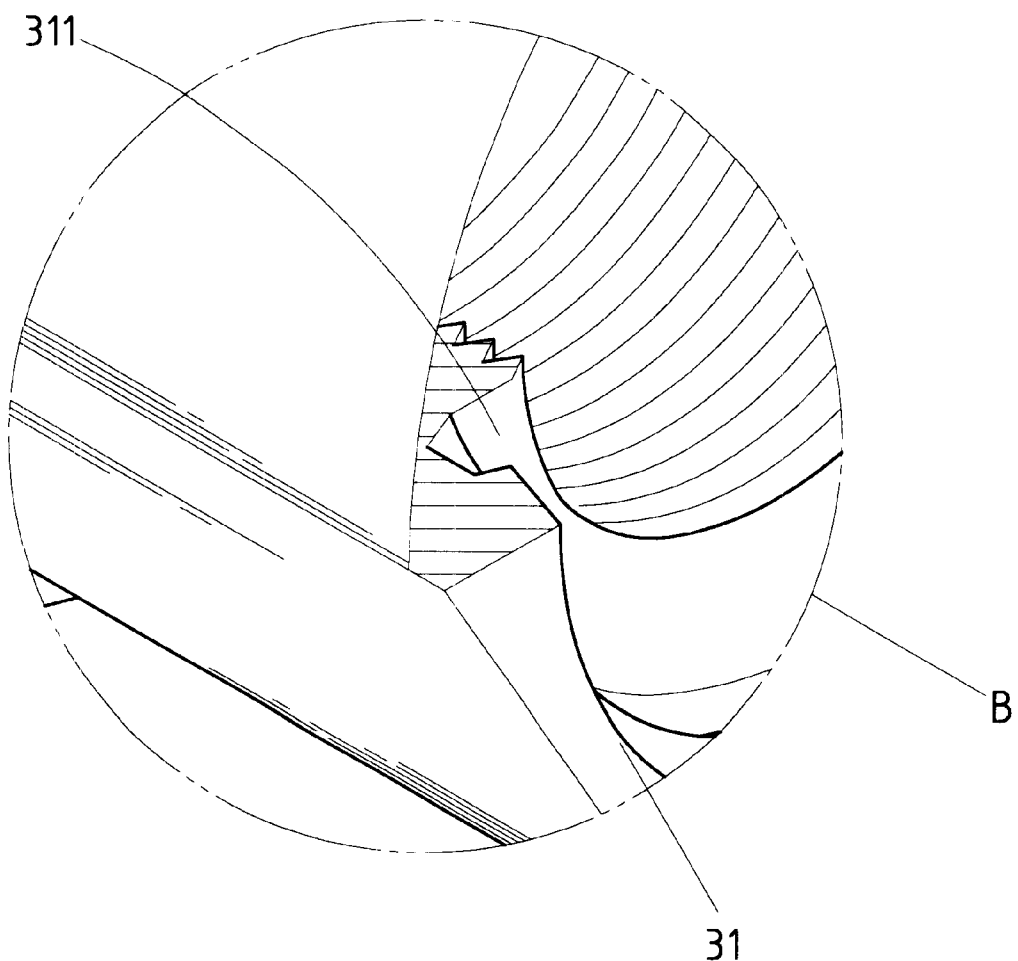
FIG. 9 shows an enlarged sectional view of a portion indicated by a circle "B" as shown in FIG. 8.

As shown in FIGS. 8 and 9, the protective cap 40 of the present invention is provided at the inner end with a retaining ring 403 in proximity of the opening 401. The protective cap 40 is engaged with the outer nut 30 such that the retaining ring 403 of the protective cap 40 is retained in the retaining slot 311 of the annular protrusion 31 of the outer end of the outer nut 30.

The protective cap 40 of the present invention may be provided with a coating of a specific pigment, or a mark, which is intended to show the direction in which the outer nut 30 is turned to fasten or unfasten. The threads of the outer nut 30 and the outer threaded portion of the large diametrical segment 101 of the bolt body 10 are susceptible to damage by the outer nut 30 which is turned in the wrong direction.

I claim:

1. A wheel assembly for a motor vehicle comprising:
    a hub having a plurality of through holes formed therein, each of said plurality of through holes having a retaining slot in one end thereof;
    a bolt assembly comprising:
        a bolt body having a large diametrical segment and a small diametrical segment opposite to said large diametrical segment, said bolt body having a midsegment located between said large diametrical segment and said small diametrical segment, said midsegment having two smooth surfaces formed thereon, each of said large diametrical segment and said small diametrical segment having an outer threaded portion, said midsegment having tangent plane in an outer surface of two opposite sides thereof such that a head stop edge is formed between said tangent plane and an outer diameter of said large diametrical segment, said bolt body having a position confining portion formed at a juncture of one side of one of the tangent planes and the outer diameter of said large diametrical segment, said position confining portion having one side that is coplanar with said tangent plane, said position confining portion having another side which forms an angle with the outer diameter of said large diametrical segment, said small diametrical segment extending through one of said plurality of through holes of said hub, said retaining slot of the through hole corresponding in cross section to a cross section of said midsegment, said midsegment being retained in said retaining slot of the through hole of the hub so as to prevent said bolt body from turning in relation to said hub, a wall of said hub being stopped by said head stop edge;
    an inner wheel rim having a plurality of through holes formed therein;
    an outer wheel rim having a plurality of through holes formed therein, said large diametrical segment extending through one of said plurality of through holes of said inner wheel rim and through one of said plurality of through holes of said outer wheel rim such that said outer threaded portion of said large diametrical segment extends out of said outer wheel rim;
    an inner nut engaged with said outer threaded portion of said small diametrical segment of said bolt body and provided in an outer edge of an outer end thereof with a protruded ring, said protruded ring defining an annular groove in an inner periphery of said inner nut;
    a retaining ring retained in said annular groove so as to contact with an outer end wall of said inner nut, said retaining ring being provided in an inner periphery with a retaining piece, said retaining piece having an arcuate edge corresponding in radian to a threaded hole of said inner nut, said retaining piece having an inner diameter smaller than a inner diameter of said threaded hole of said inner nut whereby said inner nut is fastened with said outer threaded portion of said small diametrical segment such that said arcuate edge of said retaining piece of said retaining ring is forced into grooves of the threads of said outer threaded portion of said small diametrical segment of said bolt body;
    an outer nut engaged with said outer threaded portion of said large diametrical segment of said bolt body so as to retain said inner wheel rim and said outer wheel rim, said outer nut being provided in an outer peripheral edge of an outer end thereof with an annular protrusion, said annular protrusion defining a retaining slot in an inner peripheral edge thereof; and a protective cap having a closed outer end, said protective cap having an inner end having an opening and two retaining bodies opposite to each other and located in proximity of said opening, said protective cap being engaged with said outer nut such that said retaining bodies of said protective cap are retained in said retaining slot of said outer nut, said protective cap having a length greater than a length of a portion of said large diametrical segment which extends out of said outer nut, said protective cap having an outer end wall which is smaller in thickness than an outer diameter wall of said protective cap such that said outer diameter wall of said protective cap has a compression elasticity, said protective cap being engaged with said outer nut in such a manner that said protective cap encloses said outer end of said outer nut and the portion of said large diametrical segment that extends out of said outer nut.

2. The bolt assembly of claim 1, wherein said protective cap is provided at an inner end thereof with a retaining ring in proximity of said opening whereby said protective cap is engaged with said outer nut such that said retaining ring of said protective cap is retained in said retaining slot of said annular protrusion of said outer nut.

\* \* \* \* \*